United States Patent [19]

Radlove

[11] 4,185,127
[45] Jan. 22, 1980

[54] DIETETIC CAKE MIX

[76] Inventor: Sol B. Radlove, 1165 Pleasant Run Rd., Wheeling, Ill. 60090

[21] Appl. No.: 818,531

[22] Filed: Jul. 25, 1977

[51] Int. Cl.² .......................................... A21D 13/08
[52] U.S. Cl. .................................... 426/554; 426/555; 426/658
[58] Field of Search .............. 426/554, 555, 658, 653, 426/654

[56] References Cited

U.S. PATENT DOCUMENTS

| | | | |
|---|---|---|---|
| 2,975,059 | 3/1961 | Andrews | 426/96 |
| 3,170,795 | 2/1965 | Andre | 426/551 |
| 3,227,559 | 1/1966 | Radlove | 426/611 |
| 3,236,658 | 2/1966 | Little | 426/567 |
| 3,574,637 | 4/1971 | Andre | 426/554 |
| 3,625,701 | 12/1971 | Walon | 426/658 |
| 3,625,711 | 12/1971 | Eisenstadt | 426/548 |
| 3,651,221 | 3/1972 | Conrad et al. | 424/180 |
| 3,658,553 | 4/1972 | Radlove | 426/554 X |
| 3,703,440 | 11/1972 | Okada et al. | 195/31 R |
| 3,706,575 | 12/1972 | Broadhead | 426/554 |
| 3,741,776 | 6/1973 | Mitsuhashi et al. | 426/599 |
| 3,743,518 | 7/1973 | Eisenstadt | 426/548 |
| 3,875,311 | 4/1975 | Eisenstadt | 426/548 |
| 3,928,647 | 12/1975 | Gupta | 426/554 |
| 3,973,050 | 8/1976 | Hayashibara et al. | 426/552 |

FOREIGN PATENT DOCUMENTS

563621 9/1959 Canada.

OTHER PUBLICATIONS

"Fructose Fruit Sugar," Published by Finnish Sugar Co., Ltd.
Doty et al., "Crystalline Fructose:Use as a Food Ingredient Expected to Increase," Food Technology, Nov. 1975, pp. 35–38.
Doty, *Cereal Foods World*, vol. 21, No. 2, Feb., 1976, pp. 62–63.
Volpe, *Bakery*, May 1977, p. 128.
"Now You Can Have Better Flavor, Higher Yield and Lower Production Costs... From a Single Ingredient," Amoco Foods Co., Chicago, Ill. 60601.

*Primary Examiner*—Raymond N. Jones
*Assistant Examiner*—Esther M. Kepplinger
*Attorney, Agent, or Firm*—Gerald A. Mathews; Bruce L. Samlan

[57] ABSTRACT

A dry, dietetic cake mix which need only to be combined with water, mixed and baked to produce a cake. The mix is free of artificial sweeteners, egg yolks and ordinary sugar, thus making it suitable for consumption by diabetics and coronary care patients.

Fructose provides natural sweetness and combines with a unique blend of other ingredients, including flour, emulsifiers and baking powder having glucono-delta-lactone as its acidic component to produce a cake having good volume, texture, flavor, moisture, mouth-feel, and sweetness.

11 Claims, No Drawings

DIETETIC CAKE MIX

BACKGROUND OF THE INVENTION

This invention relates to a dry, flour based dietetic cake mix. It is free of ordinary sugar, egg yolks and artifical sweeteners.

Dietetic and, especially, diabetic baked dessert foods, such as cake, chronically suffer from poor volume, texture, mouth-feel, taste, and, most notably from insufficient natural sweetness. As used here, the word "dietetic" refers to foods for those people on a special diet, such as low cholesterol and sugar free diets.

Sweeteners, including ordinary sugar (sucrose), saccharin, cyclamates, and sorbitol, and their combinations, all have some sort of undesirable attributes including after-taste, objectionable taste, side effects and potential harm to human health. For example, for some people saccharin has an unpleasant bitter metallic after-taste and has recently been banned as a carcinogen. Sorbitol has only about one half the sweetness of sucrose, but when cosumed in fairly large quantities can cause some people to suffer gastric discomfort and diarrhea. Sucrose must be used in such large amounts in order to impart the desired degree of sweetness that the product contains too many calories to make it suitable for consumption by persons on a diet. Further, sucrose is quickly metabolized, requiring insulin, which makes it generally unsuitable for diabetic use.

It has not to my knowledge been heretofore possible to provide an acceptable degree of sweetness in a dietetic cake without using non-nutritive artificial sweeteners, such as saccharin and cyclamates. My U.S. Pat. No. 3,658,553 describes the use of a combination of sorbitol (a nutritive sweetener) and saccharin in a dietary dry cake mix.

In recent years, some nutritionists and the U.S. Food and Drug Administration have from time to time expressed concern about the use of sorbitol, saccharin and cyclamates as food sweeteners, either alone or in combination with nutritive sweeteners. Such concern by the FDA has resulted in cyclamates and saccharin being banned, although there has been considerable debate over the medical basis for this action. The major concerns expressed about saccharin and cyclamates is whether they are detrimental to human health if consumed in large quantities over a long time.

In contrast to saccharin and cyclamates, fructose is a naturally occurring nutritive sweetener. It is a carbohydrate and has the same amount of calories per unit weight as another natural sugar, sucrose. Accordingly, it is believed to be as safe for human consumption as any natural food. Fructose tastes like ordinary common sugar, but is approximately 50 percent sweeter than sucrose and 150% sweeter than sorbitol. In fact, fructose is the sweetest natural sugar known. This relatively high level of sweetness allows less fructose to be required in many products with a corresponding reduction in sugar derived calories of about 20–80 percent. However, this is not true in products subjected to heat as fructose rearranges into a less sweet form when heated. Fructose varies in sweetness, depending on temperature, time, acidity and use. In heated products, fructose is generally in a less sweet form and in unheated products, it is in a sweeter form.

Compared to common sugar, fructose enters the blood stream at a relatively slow rate. In addition, fructose absorption, unlike that of either glucose or galactose, does not stimulate either glucagon from the gut or insulin from the pancreas. These and related properties are believed to enable fructose to be utilized in the body metabolism without having an adverse effect on glucose metabolism by which blood sugar is assimulated and metabolized into the body utilizing insulin. For these and other reasons which are not fully understood, studies have shown that fructose can be used in moderate amounts in the diet of persons having mild or well balanced diabetes without deleterious effects.

The relatively slow rate that fructose is absorbed and metabolized in the liver enhances the desirability of its use by the persons on a special diet since glucose is thereby released into the blood stream more evenly over an extended period of time to naturally control hunger.

Finally, because fructose is sweeter than common sugar, in some applications it can be used in smaller, more moderate, quantities in diets to provide the desired degree of sweetness with a corresponding reduction in the amount of sugar derived calories.

SUMMARY OF THE INVENTION

As desirable as the sweetening and dietetic properties of fructose are, its use as a substitute for sugar in cake has not heretofore been at all successful. The reason is that fructose loses much of its sweetness when the cake batter is heated. When used as the sweetener in ordinary cake batter, the batter tastes sweet, but the baked cake tastes flat and unsweet.

The fact that fructose loses sweetness upon being heated may well explain why it has heretofore met with virtually no success in baked products. Indeed, its primary use has been in unheated foods, especially desserts, as exemplified by U.S. patent 3,236,658 entitled, "Frustose-Containing Frozen Dessert".

In an attempt to determine why fructose loses sweetness as it is heated, some researchers have shown that this relative sweetness of fructose is related to the degree of mutarotation from the sweeter $\beta$-D-fructopyranose form of the crystalline substance to the less sweet $\beta$-D-fructofuranose and $\alpha$-D-fructofuranose forms. The term "mutarotation" refers to a change in chemical structure, under the influence of heat, to obtain a different isomer. Also, with increasing temperature an acidity, the ratio of pyranose to ferranose anomers, and, thus, the relative sweetness, decreases. In other words, as the temperature increases and the acidity increases, fructose decreases in sweetening power. These findings were reported by Theodore E. Doty in Cereal Foods World, Feb. 1976, vol. 21, No. 1.

While researchers may be able to explain how fructose loses its sweetness upon being heated, nobody has until now determined how fructose can be made to retain its sweetness, or otherwise be compensated for, in baked cakes. I have discovered a unique combination and proportion of ingredients and conditions which, when combined with fructose in a cake mix, produce a cake that is acceptably sweet and has good texture, flavor, volume, and mouth-feel as well.

The unique combination of ingredients includes flour, fructose, emulsifiers, and baking powder having glucono-delta-lactone as the acidic component.

It is not known exactly how, from a food chemistry standpoint, these ingredients, or one or more of them, enable the fructose to retain a sufficient degree of its sweetness while it is heated during the cake baking process. It is known that the resultant cake has an undeniably acceptably sweet taste. The residual sweetness in the baked cake may be a synergistic effect not directly attributable to the ordinary property of one of my unique combination of ingredients.

Further, my results relating to acidity and sweetness levels are completely contrary to what would be expected from a review of published research, as noted above. I have unexpectedly discovered that in my cake mix, the resultant cake has an acidic pH which generally falls in the range of about 3.5 to about 5.5. In fact, my research indicates that in my cake mix, the pH must be acidic or the level of sweetness in the baked cake becomes unacceptable.

Additionally, since the mix is free of egg yolks and whole milk, it is very low in cholesterol so that the cake is especially suited for coronary care patients and others requiring a low cholesterol diet.

OBJECTS OF THIS INVENTION

Accordingly, it is an object of this invention to provide a dry dietetic cake mix that utilizes fructose as the sweetening agent and produces a finished cake which is acceptably sweet.

Another object of this invention is to provide a dry dietetic cake mix that utilizes fructose as the sweetening agent and produces a baked cake which is both acceptably sweet and acidic in pH, but not sour in taste.

Another object of this invention is to provide a dry dietetic cake mix that utilizes fructose as the sweetening agent and produces a cake with good volume, moisture retention, texture, mouthfeel and acceptably sweet taste.

Another object of the invention is to provide a dry dietetic cake mix that utilizes fructose as the sweetening agent and produces a cake wherein the pH is between about 3.5 and less than 6.0.

Still another object of the invention is to provide a dry dietetic cake mix that is free of artificial sweeteners, egg yolks and ordinary sugar.

Another object of the invention is to provide a dry dietetic cake mix suitable for use by people who are diabetics or on a low cholesterol diet.

A further object of the invention is to provide a dry dietetic cake mix that utilizes fructose as the sweetener and wherein the ratio of the fructose to flour by weight is moderate, that is about 0.90 or less.

Another object is to provide a dry, dietetic cake mix that utilizes fructose as the sweetener wherein the ratio of the fructose to the acidic component of the baking powder by weight is between about 10 and about 30.

A feature of the cake mix is the use of propylene glycol monostearate, lactated monoglycerides and stearyl monoglyceridyl citrate in the shortening portion.

Another feature of the cake mix is the use of glucono-delta-lactone as the acidic component in the baking powder portion.

Another feature of the cake mix is the use of a single action baking powder.

Other objects, features and advantages of the invention will become readily apparent, especially to those skilled in the art, when the following description of the preferred embodiments is read.

DESCRIPTION OF THE PREFERRED EMBODIMENTS

This cake mix in its dry form comprises three basic components: a non-shortening portion, a baking powder portion and a shortening portion. The non-shortening portion essentially consists of the stable, non-reactive ingredients, such as flour, skim milk solids, egg whites and salt.

The baking powder portion consists of a "balanced" amount of alkaline bicarbonate component (bicarbonate of soda) and an acid which reacts with the bicarbonate in the presence of water to liberate carbon dioxide gas. This gas is dispersed throughout the batter to give the baked cake its characteristic light texture and mouthfeel. The particular acidic component of the baking powder used in this cake, and the relative proportion, is important as will be explained in more detail when the examples are described.

The shortening portion comprises a blend of primary emulsifiers, an emulsifier enhancer and vegetable fat or oil. The preferred fat component used in this cake mix is a liquid vegetable oil and is selected for its stability since it is desired to prevent oxidation and subsequent rancidification of the shortening while the mix is on the retailer's shelf. Hydrogenated vegetable oils are high in saturated fats. The higher the saturated (i.e. hydrogenated) fat level, the more stable the product. Conversely, the lower the saturated fat level, the less stable the product. Our preerred liquid vegetable oil is primarily monounsaturated, but contains some saturated, and a small portion of polyunsaturated, fatty acids.

The dry mix is formed when the non-shortening, baking powder and shortening portions are combined and blended to produce a powder suitable for packaging. Adding water to the dry mix powder and blending produces a batter ready for baking.

When water is added to the dry mix, the emulsifiers act to combine the oil (fat) in the shortening with the water so that they can be mixed with the other ingredients to form a homogenuous mixture and to incorporate air into the batter.

In some cake mixes, a so-called "double action" baking powder is used. Such a "double action" baking powder has some components that react with water at room temperature to produce carbon dioxide gas while the batter is being mixed to make the batter "light" before it is baked. Such "lightness" in the batter is important to assure uniformity of the well known spongelike texture in the baked cake. Other components react when the batter is heated to form the carbon dioxide gas to make the cake rise to its final dimensions as it is baked.

My cake uses a "single action type" baking powder that reacts in the presence of water only when heat is applied in the oven. However, due to the unusual blend of emulsifiers, emulsifier enhancers, and their very effective reaction and combination with other ingredients, I am able to achieve sufficient rising in the batter as the cake is being baked to avoid the necessity of using a double action baking powder. Still, I achieve excellent uniformity and good texture in the baked cake.

By eliminating the necessity of using a double acting baking powder, the stability of the mix on the shelf is increased since the single action baking powder is not as susceptible to reaction with moisture in the air and subsequent deterioration.

It is important that the acidic and basic components of the baking powder be balanced. This does not necessarily mean that equal amounts or weights of these components be used, but rather that they are so proportioned that after their chemical reaction with the other ingredients, the cake is neither sour, as when the acidic component dominates excessively, or flat, tasteless, or off-taste as when the basic component dominates. Such an acidic/basic balance to achieve good taste is not easy to obtain and is utterly unpredictable, even by food experts, based on the ordinary taste and flavor of the ingredients alone and their relative proportions. The relationships between taste, flavor, sweetness, texture and mouth-feel are so delicate, complex, interdependent and variable that merely adding or deleting an ingredient with a known property (such as a flavor enhancer) or taste (such as fructose) or changing the relative proportion of it in the mix does not automatically produce the expected result. For example, if the acidic and basic components are balanced to produce a neutral pH cake, the flavor may not be strong or an off-taste may be present.

In this regard, I have found that in order to retard, suppress or otherwise compensate for the chemical change of the fructose into less sweet components in my cake mix batter as the cake is baked, the baking powder portion must be somewhat acidic so that the baked cake itself is slightly acidic and sweet tasting. However, too much acidity may produce a bitter or sour tasting cake. In other words, when fructose is used as the sweetener, the overall sweetness of the batter is retained in the cake when the acidic component of the baking powder dominates, but to a limited extent. As pointed out in the Summary of the Invention, this contradicts published authority on the behavior of fructose when it is heated and is, I believe, one of the reasons for the success of my cake mix. If fructose is merely substituted for sugar in an ordinary cake mix, the baked cake is absolutely flat tasting instead of being comparatively sweet.

The acidic component of the baking powder that I have found to produce the best results is glucono-delta-lactone (a gluconate herein referred to as GDL). However, other acid components (gluconates and others) can be used with varying degrees of acceptable results. Some of these acids are calcium acid mono-phosphate, sodium aluminum phosphate (acidic), tartaric, fumaric, or any edible acid such as citric, lactic or malic acid that is in a fine, preferably powdered or crystalline, form and is coated or micro-encapsulated with a material, such as a hard fat or emulsifier, that will prevent premature reaction with the basic (alkaline) component of the baking powder during storage or while the batter is being mixed. The basic component of the baking powder is either sodium or, preferably, potassium bicarbonate. Depending on the specific cake formulation, the bicarbonate may be encapsulated in lieu of the GDL, or both may be encapsulated.

The primary emulsifier that provides the best results is actually a blend of two emulsifiers, propylene glycol monostearate (PGMS) and a lactated monoglyceride (LMG), such as Durlac 100 which is manufactured by Durkee Foods.

Other primary emulsifiers can be used with acceptable results. Examples are glyceryl lacto-stearate (GLS) and glyceryl monstearate (GM).

An emulsion enhancer is included in the shortening portion. This is stearyl monoglyceridyl citrate (SMGC) which also functions as a stabilizer and is described in my U.S. Pat. No. 3,227,559. In this cake mix, the SMGC functions to stabilize the batter before and during baking and also enhances flavor and texture. The shortening is preferably a liquid vegetable oil, such as Durkex 500 made by Durkee Foods, that has a high oxidative stability.

The following examples are presented to teach the various means of practicing my invention including the best mode contemplated at present. Naturally, these examples should not be interpreted as representing the only way the invention can be practiced.

In each of the following examples, the Non-Shortening and Shortening Portions are the same, with only the Baking Powder Portions varying. Also in each example, the mixing instructions are the same as follows:

MIXING INSTRUCTIONS

Add five ounces of water to the mix in a small bowl and mix slowly to wet ingredients. Mix for four minutes at a speed corresponding to number six to seven on a Sunbeam Mixmaster. Pour 12.5 ounces of batter into a small (i.e. 8 ½"×4 ½"×2⅝") loaf pan or an 8 inch round pan and bake for 30 minutes at 350° F. Remove cake and allow to cool.

To test the acidity of the batter and of the cake at various times during the baking process, a batch of batter of examples 1 and 2 was placed in each of six paper cupcakes. They were all placed in the oven and removed one at a time in five minute intervals. After cooling, some of each sample was placed into a ceramic cup with distilled water and mixed for 15–20 seconds. The aqueous mixture was then tested with universal pH paper which was then compared to a standard to measure the pH.

| Dietary White Cake Mix | | |
|---|---|---|
| Non-Shortening Portion | | |
| Ingredient | Ounces | Grams |
| Flour | 3.775 | 106.98 |
| Fructose | 3.0 | 85.02 |
| Skim Milk Solids | 0.45 | 12.75 |
| Dried Egg Whites | 0.25 | 7.09 |
| Torula Yeast (Torutein 94) | 0.25 | 7.09 |
| Starch (721A) | 0.10 | 2.83 |
| Vanillin (16 fold) | 0.02 | 0.57 |
| Salt | 0.09 | 2.55 |
|  | 7.935 | 224.88 |
| Shortening Portion | | |
| Ingredients | Ounces | Grams |
| Liquid Shortening (Durkex 500) | 1.23 | 35.0 |
| Propylene Glycol Monostearate | 0.07 | 2.0 |
| Lactated Monoglycerides (Durlac 100) | 0.07 | 2.0 |
| Stearyl Monoglyceridyl Citrate | 0.035 | 1.0 |
|  | 1.405 | 40.0 |

EXAMPLE 1

| Baking Powder Portion | | |
|---|---|---|
| Ingredient | Ounces | Grams |
| Potassium Bicarbonate | 0.10 | 2.83 |
| Glucono Delta Lactone | 0.22 | 6.23 |

Comments on Cake

| | pH Data | |
|---|---|---|
| | Baking Time | pH |
| Color: Uniform medium brown top | batter | 6.0 |
| Sweetness: Acceptable | 5 min. | 6.0 |
| Overall quality: Good texture and | 10 min. | 6.0 |
| volume | 15 min. | 5.0 |
| Good cake | 20 min. | 5.0 |
| | 25 min. | 4.5 |

EXAMPLE 2

| Baking Powder Portion | | |
|---|---|---|
| Ingredient | Ounces | Grams |
| Potassium Bicarbonate | 0.1 | 2.83 |
| Sodium Aluminum Phosphate (acidic) | 0.1 | 2.83 |

Comments on Cake

| | pH Data | |
|---|---|---|
| | Baking Time | pH |
| Color: Uniform medium brown top | batter | 6.5 |
| Sweetness: Very low | 5 min. | 6.5 |
| Overall quality: Good texture and | 10 min. | 6.0 |
| volume, but not an | 15 min. | 6.0 |
| acceptable cake due to | 20 min. | 6.0 |
| insufficient sweetness | 25 min. | 6.0 |

EXAMPLE 3

| Baking Powder Portion | | |
|---|---|---|
| Ingredient | Ounces | Grams |
| Potassium Bicarbonate | 0.1 | 2.83 |
| Sodium Aluminum Phosphate | 0.1 | 2.83 |
| Glucono Delta Lactone | 0.05 | 1.417 |

Comments on Cake

Color: Uniform medium brown top — pH Data
Sweetness: Slightly sweet, barely acceptable — cake pH = 5.0
Overall quality: Good texture and volume; good cake.

EXAMPLE 4

| Baking Powder Portion | | |
|---|---|---|
| Ingredient | Ounces | Grams |
| Potassium Bicarbonate | 0.1 | 2.83 |
| Sodium Aluminum Phosphate (acidic) | 0.2 | 5.67 |

Comments on Cake

Color: Uniform medium brown top — pH Data
Sweetness: Slightly Sweet — Cake pH = 5.0
Overall quality: Good volume and texture, but as the mouthfeel taste was mealey the cake was unacceptable.

EXAMPLE 5

| Baking Powder Portion | | |
|---|---|---|
| Ingredient | Ounces | Grams |
| Potassium Bicarbonate | 0.1 | 2.83 |
| Glucono Delta Lactone | 0.18 | 5.10 |

Comments on Cake

Color: Uniform Medium brown top — pH Data
Sweetness: Slightly Sweet — cake pH = 5.0
Overall quality: High volume, good texture; acceptable cake.

EXAMPLE 6

| Baking Powder Portion | | |
|---|---|---|
| Ingredient | Ounces | Grams |
| Potassium Bicarbonate | 0.1 | 2.83 |
| Glucono Delta Lactone | 0.11 | 3.12 |

Comments on Cake

Color: Uniform medium brown top — pH Data
Sweetness: Very low sweetness, barely acceptable — cake pH = 6.0
Overall quality: Good volume and texture.

EXAMPLE 7

| Baking Powder Portion | | |
|---|---|---|
| Ingredient | Ounces | Grams |
| Potassium Bicarbonate | 0.1 | 2.83 |
| Anhydrous citric acid - coated with 30% Stearine (Durkee's # 150 - 70 (SR) | 0.13 | 3.68 |

Comments on Cake

Color: medium brown top with small dark spots — pH Data
Sweetness: slightly bitter — Cake pH = 4.0
Overall quality: Good texture and volume, but cake was too bitter to be acceptable.

EXAMPLE 8

| Baking Powder Portion | | |
|---|---|---|
| Ingredient | Ounces | Grams |
| Potassium Bicarbonate | 0.1 | 2.83 |
| 70% citric acid (encapsulated) | 0.09 | 2.55 |

Comments on Cake

Color: medium brown top with small dark spots — pH Data
Sweetness: Slightly sweet — cake pH = 5.0
Overall quality: dark spots caused by small crystals of citric acid. Small areas of gunky masses just under surface of cake. Cake not acceptable.

From these examples, it is seen that the degree of acidity, measured in pH, of acceptable cakes, as determined by their sweetness, varies from about 4.5 to about 5.0. In my opinion, acceptably sweet cakes can be made having pH values somewhat below 4.5 and somewhat above 5.0. The pH range would then extend from about 3.5 to less than about 6.0 for cakes having acceptable sweetness. Cakes having a pH less than about 3.5 might tend to be too sour or bitter, and cakes having a pH above about 6.0 might tend to be bland and not sweet enough.

As can be readily seen from examples 1 (best mode) and 2, the acidity increases as the baking cycle continues. Further, the more acidic the cake, up to a point, the sweeter it is starting with the same amount of fructose.

Tests 2, 3 and 4 illustrate that with the shortening and non-shortening portions as described, acidic sodium aluminum phosphate in the white cake cannot be substituted satisfactorily for GDL and produce an acceptably sweet cake. However, when GDL is used with sodium aluminum phosphate, the cake is acceptably sweet. The cake produced with sodium aluminum phosphate (acidic) alone is either insufficiently sweet, or mealey. It is possible, however, that in modifying the shortening and non-shortening portions, an acceptably sweet cake could be made.

Comparing tests 2, 3, 4 with the cake baked with varying amounts of GDL in tests 1, 5 and 6 shows that GDL produces a cake of superior sweetness and the sweetness increases as the cake becomes more acidic up to a point (a pH of about 3.5).

Tests 7 and 8 illustrate what happens if the acidic component of the baking powder is too coarse, even when it is coated, or microencapsulated, to prevent premature reaction with the alkaline component of the baking powder. If the citric acid in test 7 had been in a fine grade, such as a powder or very fine grains, the cake would have been acceptable.

In the non-shortening portion, some of the ingredients are common to many cake mixes. These are flour, starch, skim milk solids, dried egg whites and salt. The torula yeast functions as a replacement for some egg whites, which are quite expensive, and as a flavor enhancer. As passable cake can be made omitting the torula yeast, but is is not as light. Egg yolks are not needed due to the effectiveness of the emulsifiers. Vanillin is an artifical flavoring.

Some other observations can be made from the results of the examples. One is that a great deal of fructose is not needed to obtain the desired sweetness. It is reasonable to conclude, for example, that if 6, 8 or 10 ounces of fructose, instead of 3 ounces, were mixed with 3.775 ounces of flour, a sweet cake would be produced regardless of its pH value. However, this would be a much more expensive cake having much more calories and sugar. Such a cake would be contrary to the objects, features and advantages of my cake.

Therefore, the ratio of fructose to flour by weight in my cake is moderate. In my preferred embodiment, I use a ratio of about 0.8 (i.e. 3.0 oz. divided by 3.775 oz.), although a slightly higher ratio (i.e. about 0.9) would still produce an acceptable cake. A related ratio is the ratio of fructose (85.02 gm to the weight of the non-shortening portion of the mix 224.88 gm). This ratio (0.38), plus or minus about 10% is also indicative of the moderate amount of fructose utilized by my cake mix which produces an acceptably sweet cake.

Another ratio of significance is the weight of the fructose to the acidic component of the baking powder portion. This ratio varies from about 10 (13.65 in example 1) to about 30 (27.25 in example 6).

Other observations relate to the ratios of the acidic and basic components and of the non-shortening, shortening and baking powder portions. As with the pH values, I am concerned with those ratios in cakes that have proved to be acceptably sweet.

In examples 1, 3, 5 and 6, the ratio of the acidic component to the basic (bicarbonate) component ranged from 1.1:1.0 to 2.2:1.0.

Regarding the ratios of the non-shortening/shortening and baking powder portions in examples 1, 3, 5, 6, 7 and 8, the range was from 82.1:14.59:3.31 in example 1 to 83.22:14.79:1.99 in example 8. These ratios are illustrative of the relative proportions of the three major components of the cake mix.

The examples pertain to a white cake mix. If, for example, a lemon flavored cake mix is desired, lemon oil or flavor is added to the dry mix in an amount necessary to provide the desired degree of lemon flavor.

Naturally, some substitutions can be made in the ingredients, and their relative proportion, without departing from the spirit and scope of the invention. This is especially true of the more common ingredients in the non-shortening portion of the mix. For example, the fructose in these examples was provided in pure crystalline form. However, the fructose can be provided in a liquid form, such as a high fructose corn syrup. Thus, the sweetness is provided essentially by fructose, especially in the sense that the baked cake retains its diabetic and dietetic use, characteristics and qualities. Further, while specific examples of a cake mix have been described in detail, it is contemplated that other baked products can be readily produced with the dry mix described. These would include, but are not limited to, pancakes, waffles, doughnuts, muffins and cupcakes.

What is claimed is:

1. In a dietetic, dry cake mix, free of artificial sweeteners, having
    (1) a non-shortening portion comprising flour, a sweetener, skim milk solids and dried egg whites;
    (2) a shortening portion comprising a shortening and an emulsifier;
    (3) a baking powder portion comprising an alkaline bicarbonate component and an acidic component;
the improvement wherein:
    the sweetener consists essentially of fructose;
    the acidic component of the baking powder includes glucono delta lactone and the ratio by weight of the acidic component to the alkaline component is greater than about 1.5:1.0;
    the fructose and glucono delta lactone are present in such portions that the ratio by weight of the fructose to the acidic component is between about 10 and about 30 so that the cake baked from batter formed when the dry cake mix is combined with water is acidic with a pH of between about 3.5 and about 5.5, has acceptable sweetness, moisture, good volume, texture, and mouth-feel.

2. The cake mix as set forth in claim 1, wherein:
the mix is free of egg yolks.

3. The cake mix as set forth in claim 1, wherein:
the ratio of the non-shortening, shortening, and baking powder portions, respectively, by weight is about 83:15:2 to about 82:14.5:3.5.

4. The cake mix as set forth in claim 1, wherein:
the acidic component of the baking powder portion further includes sodium aluminum phoshate.

5. The cake mix as set forth in claim 1, wherein:
the ratio by weight of the fructose to the non-shortening portion of the mix, including fructose, is from about 0.34:1.0 to about 0.41:1.0.

6. The cake mix as set forth in claim 1, wherein:
the non-shortening portion includes about 107 pars flour, 85 parts fructose, 13 parts skim milk solids and 7 parts dried egg whites.

7. The cake mix as set forth in claim 1, wherein:
the shortening portion includes about 35 parts shortening, 2 parts each of propylene glycol monostearate and lactated monoglycerides and 1 part stearyl monoglyceridyl citrate.

8. The cake mix as set forth in claim 1, wherein:
the acidic component further includes a finely divided grade of citric crystalline edible organic acid.

9. A dietetic, dry cake mix, free of artificial sweeteners and egg yolks, having non-shortening, shortening and baking powder portions, wherein:
the non-shortening portion includes flour, skim molk solids, dried egg whites, and a sweetener;
the sweetener consists essentially of fructose which is present in a ratio by weight with the non-shortening portion, including fructose, of about 0.34:1.0 to 0.41:1.0;

the ratio by weight of the fructose to the flour is about 0.90 or less;

the baking powder portion includes an alkaline bicarbonate component and an acidic component including glucono delta lactone wherein the ratio by weight of the acidic component to the alkaline component is greater than about 1.5:1.0;

the shortening portion includes vegetable shortening and an emulsifier;

the cake baked from batter formed when the dry cake mix is combined with water has a pH between about 3.5 to about 5.5, has acceptable sweetness and moisture, and good volume, texture and mouth-feel.

10. The cake mix as set forth in claim 9, wherein:

the shortening portion includes propylene glycol monostearate, lactated monoglycerides and an emulsifier enhancer.

11. The cake mix as set forth in claim 9, further including:

torula yeast, starch, vanillin and salt in the non-shortening portion.

* * * * *